United States Patent [19]

Sakai

[11] Patent Number: 4,727,466
[45] Date of Patent: Feb. 23, 1988

[54] APPARATUS FOR CONTROLLING REACTIVE POWER IN A HVDC SYSTEM

[75] Inventor: Takami Sakai, Tokyo, Japan

[73] Assignee: Kabushiki Kaisha Toshiba, Kawasaki, Japan

[21] Appl. No.: 899,028

[22] Filed: Aug. 22, 1986

[30] Foreign Application Priority Data

Aug. 30, 1985 [JP] Japan .................. 60-191566

[51] Int. Cl.$^4$ ................ H02J 3/36
[52] U.S. Cl. .................. 363/35; 323/209; 363/79
[58] Field of Search .......... 363/35, 79; 323/207, 323/210, 209

[56] References Cited

U.S. PATENT DOCUMENTS 4,598,350  7/1986  Sakai et al. .................... 363/35
4,600,981  7/1986  Sakai et al. .................... 363/35

FOREIGN PATENT DOCUMENTS 67978  12/1982  European Pat. Off. .......... 363/35
41-13539  7/1966  Japan .
73240  6/1979  Japan ........................... 363/35
29029  2/1983  Japan ........................... 363/35

OTHER PUBLICATIONS

Direct Current, Sep. 1956, vol. 3, No. 2, p. 55.

Primary Examiner—William H. Beha, Jr.
Attorney, Agent, or Firm—Cushman, Darby & Cushman

[57] ABSTRACT

A power converter apparatus for a DC power transmission system or a frequency conversion system includes a control apparatus that functions such that during the operation of converters, when the output voltage of a constant reactive control circuit reaches the output voltage of a margin angle limited control circuit, a shunt reactor is interrupted or a shunt capacitor is closed, and when the output voltage of the constant reactive power control circuit reaches a control delay angle corresponding to the curve which has a difference ΔQ compared with the curve P-Q at a minimum margin angle γ min, the shunt reactor is closed or the shunt capacitor is interrupted.

6 Claims, 6 Drawing Figures

APPARATUS FOR CONTROLLING REACTIVE POWER IN A HVDC SYSTEM

BACKGROUND OF THE INVENTION

1. Field of the Invention:

This invention relates to a power converter apparatus for a DC power transmission system or a frequency conversion system.

2. Description of the Prior Art:

In the present power industry, larger power transmission has become an important subject. In large power transmission, both AC and DC power transmission systems may be found. However, in recent years, DC power transmission systems have been employed because of the following reasons:

(1) A DC power transmission system has no problem with stability so that power transmission capacity can be increased up to the limit of its current capacity.

(2) In DC power transmission, no reactive power results in minimized voltage regulation and losses caused by reactive power can never occur.

(3) The overhead lines in a DC power transmission system have by far a higher flashover voltage than those of an AC power transmission system, so that the cost required for insulation can be extremely reduced.

A DC power transmission system is provided with a rectifier and an inverter interconnected through DC power transmission lines so as to deliver and receive power. A frequency conversion system is provided with a rectifier and an inverter connected directly without DC power transmission lines so as to perform the same function. Therefore, a description will be made as to a DC power transmission system which has the above-described advantages, and those skilled in the art will appreciate the same applies to a frequency conversion system.

FIG. 1 shows a schematic configuration of a DC power transmission system with converter apparatus and the control apparatus therefor. In FIG. 1, the DC sides of converters 1A and 1B are connected to each other by way of DC power transmission lines 3 through respective DC reactors 2A and 2B. The AC sides of converters 1A and 1B are connected through converter transformers 4A and 4B, and circuit breakers 5A and 5B to respective AC power systems 6A and 6B.

The converters 1A and 1B are provided with margin angle limiter control circuits 7A and 7B, and constant current control circuits 8A and 8B, respectively. Margin angle limiter control circuits 7A and 7B limit the margin angles of converters 1A and 1B so as not to become below minimum margin angle reference values γ such that converters 1A and 1B can never cause commutation failure. The minimum margin angle reference values γ (to be later described) are established by margin angle reference setters 9A and 9b connected to margin angle limiter control circuits 7A and 7B, respectively.

A voltage corresponding to a current reference value which is the output of a constant power control circuit 10 and voltages corresponding to DC currents which are detected by DC current detectors 11A and 11B and in turn converted by current/voltage conversion circuits 12A and 12B are respectively fed into adders 13A and 13B. Difference outputs from adders 13A and 13B are fed into the constant current control circuits 8A and 8B. Adders 13A and 13B further receive through switches 14A and 14B the outputs of current margin setters 15A and 15B, which determine whether converters 1A and 1B are operating as rectifiers or inverters. One of converters 1A and 1B which is connected to a closed one of switches 14A and 14B is operated as an inverter, and the other converter with switch 14A or 14B opened is operated as a rectifier.

Assume now that the switch 14A is opened while the switch 14B is closed. In this case, a control advanced angle preference circuit 17A outputs an input from constant current control circuit 8A. The output of control advanced angle preference circuit 17A is fed into a phase control circuit 18A so as to be converted into a pulse signal that determines trigger timings of converter 1A, which is fed through a pulse amplifier 19A into converter 1A as a gate pulse signal. In the case where converter 1A is operated as an inverter, the control advance angle preference circuit 17A outputs the smallest value among the outputs of constant current control circuit 8A, margin angle limiter control circuit 7A and a constant reactive power control circuit 16.

Since the switch 14B is closed, converter 1B is operated as an inverter. In this case, a control advanced angle preference circuit 17B outputs the smallest value among the outputs of margin angle limiter control circuit 7B, constant current control circuit 8B and constant reactive power control circuit 16. The output of constant reactive power control circuit 16 becomes necessary when converter 1B is operated so as to perform reactive power control of the AC power system. In this case control advanced angle preference circuit 17B outputs an input from constant reactive power control circuit 16, and circuit 17B produces, on the basis of the received signal, a phase signal and feeds the same to a phase control circuit 18B. Phase control circuit 18B converts the received phase signal into a pulse signal that determines trigger timings of converter 1B. The pulse signal is fed through a pulse amplifier 19B into converter 1B as a gate pulse signal.

The above-described configuration of control circuits for converters is known as a prior art, and it is also a well-known fact that the operation characteristic curves of such a DC linkage system is as shown in FIG. 2, wherein the abscissa designates DC current Id, and the ordinate DC voltage Ed.

In FIG. 2, a line a-b-c represents an operation characteristic curve of converter 1A when it operates as a rectifier (because switch 14A is assumed to be opened, converter 1A is a rectifier). The line a-b is a portion of regulation which is determined by a commutation impedance that includes a converter transformer 4A. The line b-c is a portion of constant current characteristic determined by the operation of the constant current control circuit 8A. A line d-e-f represents an operation characteristic curve of converter 1B when it operates as an inverter (because switch 14B is assumed to be closed, converter 1B is an inverter). The line d-e is a portion of constant current characteristics determined by the operation of constant current control circuit 8B. The line e-f is a portion of constant margin angle characteristics of converter 1B determined by the operation of margin angle limiter control circuit 7B. Here, the difference between the points c and d on the abscissa of the operation characteristic curve in FIG. 2, which represents the difference of DC current Id corresponds to the current margin.

The converters in the DC power transmission system are operated at the point A (in FIG. 2) which is the intersection of the operation characteristic curves of converters 1A and 1B. Converters 1A and 1B of the DC power transmission system is generally provided with constant power control circuit 10 in order to control transmission power to be shared between AC power systems 6A and 6B. The power reference value established by an active power reference setter 20 and a detected power value produced from a power detector 21 that detects transmission power are fed, with polarities opposite to each other, into adder 22. The difference output of adder 22 is amplified within constant power control circuit 10 so as to become the above-described current reference value. This configuration allows the transmission power to be controlled in accordance with the power reference value.

As can seen from the operation characteristic curves shown in FIG. 2, the converter operated as an inverter determines the DC voltage, while the converter operated as a rectifier determines the DC current so as to control power transmission.

However, converters are considered, when operating as either rectifiers or inverters, to be a lag load when observed from the respective AC power systems, and the power factors thereof are wellknown to be substantially proportional to the cosine of a control delay angle or that of a control advance angle. Therefore, a reactive power control circuit is provided to control the reactive power. A reactive power reference value established by a reactive power reference setter 23 is fed, with a polarity opposite to the reactive power detected value produced from a reactive power detector 24, into an adder 25, and the difference output thereof is amplified within a constant reactive power control circuit 16, and in turn, fed into control advanced angle preference circuits 17A and 17B.

Although not shown in FIG. 1, it is naturally practiced that when the reactive power of AC power system 6A is controlled, the reactive power thereof is detected by reactive power detector 24, and when the reactive power of AC power system 6B is controlled, the reactive power thereof is detected. Even when the reactive power of AC power system 6A is controlled under such a condition that converter 1A is operated as a rectifier, should the margin angle of converter 1B be controlled in accordance with the output of constant reactive power control circuit 16, the control angle of converter 1A varies so as to follow the margin angle of converter 1B, so that the reactive power of AC power system 6A can be naturally controlled.

Assuming that when both converters 1A and 1B are operated at point A in FIG. 2 and the control delay angles thereof are increased by the operation of constant reactive power control circuit 16 in order to increase lagging reactive power which is consumed within converter 1B, the DC voltage is lowered, so that the line d-e-f of the operation characteristic curve shifts to the line d'-e'-f'. Also, constant power control circuit 10 increases, in order to cause transmission power to follow the power reference value, the DC current increases so as to compensate for the lowered DC voltage, and as a result of this, the line a-b-c of the operation characteristic curve of the converter 1A shifts to the line a-b'-c', consequently operation point A of both converters shifts to point A'. (The transmission power can be considered as the multiplification of the DC voltage and the DC current, so that a curve of constant power becomes a hyperbola on which the operation points of both converters are invariably present as shown in FIG. 2).

As is known, the above-described DC power transmission system is provided with shunt reactors and shunt capacitors as components of phase-modifying equipment. Shunt reactors 26A and 26B through circuit breakers 25A and 25B, and shunt capacitors 28A and 28B through circuit breakers 27A and 27B are respectively connected to respective AC power systems 6A and 6B. It is also generally known that the number of units of phase-modifying equipment and the capacity thereof depend upon the specifications of system operations.

Prior-art control methods have provided for phase-modifying equipment such that on the basis of the power reference value established by the power reference setter 20 and the detected value derived from the active power detector 21 in FIG. 1, ON-OFF controls of phase-modifying equipment are uniformly performed. For example, when the power reference value set by power reference setter 20 is less than 30%, only shunt reactor 26B is closed. When it is in the range of 30% to 70%, both shunt reactor 26B and shunt capacitor 28B are interrupted. When it is more than 70%, only capacitor 28B is closed.

The above-described prior-art control method is relatively simple and has no problem in the case of a constant DC voltage control or a constant margin angle control wherein a reactive power control or an AC power system voltage control is not performed. However, in the case of the above-described system wherein reactive power is controlled, the method has various disadvantages which will be described hereinafter.

FIG. 3 is a diagram illustrating the capability of controlling reactive power by the converters in FIG. 1. In FIG. 3, the abscissa designates transmission power P, and the ordinate reactive power Q. For the sake of simplicity, shunt reactor 26B and shunt capacitor 28B are assumed to be equal in capacity.

Although not shown in FIG. 1, converters generate harmonics, so that there are usually provided AC filters to absorb the harmonics. The AC filters can be considered as leading reactive power sources, so that in FIG. 3, the capacities corresponding to the AC filters are assumed to be certain appropriate values.

First, in FIG. 3, the hatched region surrounded by the points A, B, C, D and E represents the case where only shunt capacitor 28 is closed. The curve A-B represents the relationship of P-Q in the operation at a minimum margin angle (hereinafter simply referred to as γ min). The represents the P-Q curve in the operation at a maximum margin angle corresponding to the capability of a continuous operation with a 100% DC current of the converter. The straight lines A-E and B-C respectively represent the minimum limit and the maximum limit of the transmission power. The curve C-D represents the limit of constant operation with a 100% DC current.

When shunt capacitor 28B is interrupted, the hatched region moves downward substantially in parallel. Here, the reactive power controllable region under the condition in which both shunt reactor 26B and shunt capacitor 28B are interrupted is represented by the region surrounded by the points M, C, N, Q and R. In addition, when shunt reactor 26B is closed, the thus moved region further moves downward substantially in parallel. Namely, the reactive power controllable region under the condition in which shunt reactor 26B has been closed is represented by the region surrounded by the points G, H, I, J and K.

Here, assumption is made such that shunt capacitor 28B and shunt reactor 26B are not closed, that the system is operated with a power reference value (output value) which is less than 70%, and that reactive power is operated at a point corresponding to the point C' in FIG. 3. When the system is required to operate at 80% of a power reference value (output value), the operation cannot be performed within the region surrounded by the points M, C, N, Q and R, so that shunt capacitor 28B inevitably becomes closed at the 70% power line connecting points B' and D'. When shunt capacitor 28B is closed, leading reactive power is supplied to the system, so that the operation region thereof moves upward substantially parallel. In this case, the operation region becomes the region surrounded by the points B', B, C, D and D'. Next, in the case where the system load is reduced and the system is operated at 60% of a power reference value (output value), shunt capacitor 28B is interrupted at the 70% line connecting points B' and D', consequently the operation region moves again downward.

In this case, the converters can no longer be operated within the region surrounded by the points A, B', C', F and E since in this region, the transmission power is less than 70% yet operation in this region defined by points A, B, C, D and E is controlled to occur only when the system is operated at greater than 70% of the power reference value. This causes such a disadvantage that the reactive power controllable region of the converters is inevitably restricted and decreased by the control of phase-modifying equipment to a considerable extent.

SUMMARY OF THE INVENTION

Accordingly, one object of this invention is to provide a power converter apparatus for a DC power transmission system or a frequency conversion system having a control apparatus that can considerably expand the operation region which is a reactive power controllable region of the converters.

The above-described objects of this invention can be achieved by providing a DC to AC power converter having a DC power to AC power converter first means for rendering reactive power more leading and second means for rendering reactive power more lagging. A margin angle limiter control circuit limits the margin angle of the converter and a constant reactive control circuit controls the converter to maintain constant a characteristic of the AC power influenced by all reactance connected to the AC power. A control delay angle generator generates a value related to a characteristic of the AC power influenced by all resistance connected to said AC power. The power converter apparatus further includes a control apparatus that either connects the second means to or disconnects the second means from the AC power when an output value of the constant reactive control circuit achieves a predetermined relationship with an output value of the margin angle limiter control circuit and either disconnects the second means from or connects the first means to the AC power when an output value of the constant reactive control circuit achieves a predetermined relationship with said control delay angle value.

BRIEF DESCRIPTION OF THE DRAWINGS

A more complete appreciation of the invention and many of the attendant advantages thereof will be readily obtained as the same becomes better understood by reference to the following detailed description when considered in connection with the accomanying drawings, wherein.

DETAILED DESCRIPTION OF THE PREFERRED EMBODIMENTS

Figure 4:
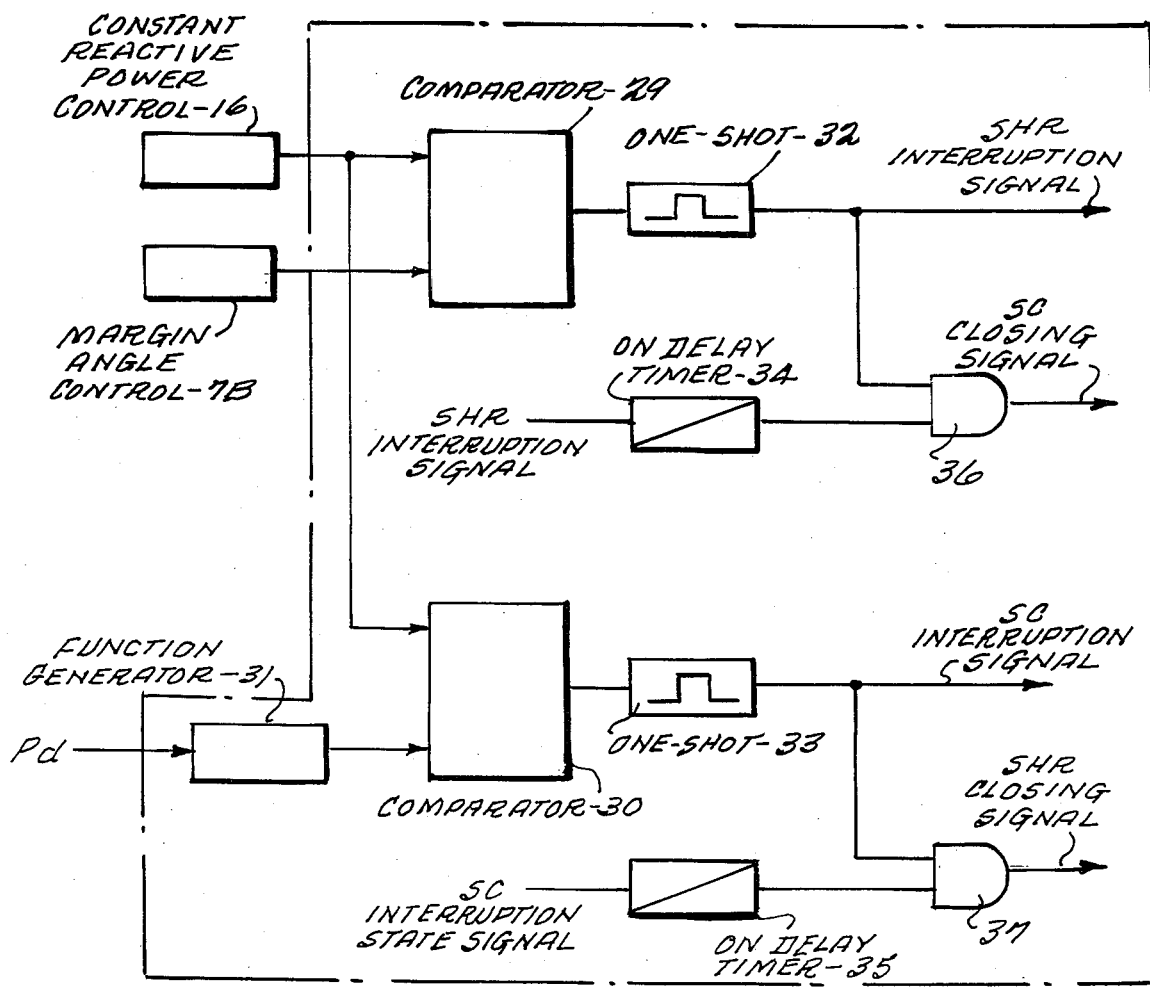
FIG. 4 is a block diagram illustrating one embodiment of the present invention.

Referring now to the drawings, wherein like reference numerals designate identical or corresponding parts throughout the several views, and more particularly to FIG. 4 thereof, one embodiment of the present invention will be described. The preferred embodiment shown in FIG. 4 is adapted to be connected to converter 1B in FIG. 1 operated as an inverter. However, the present invention may also be used in conjunction with a converter such as 1A when used as an inverter.

A power converter for a DC power transmission system or a frequency conversion system is generally provided with a phase-modifying equipment which includes a shunt reactor (hereinafter simply referred to as SHR) and a shunt capacitor (hereinafter simply referred to as SC).

In FIG. 4, the outputs of a constant reactive power control circuit 16 and a margin angle limiter control circuit 7B are fed into a comparator 29. Comparator 29 produces an output of logic signal "1" when the output value of constant reactive power control circuit 16 becomes equal to the output value of margin angle limiter control circuit 7B. A comparator 30 produces an output of logic signal "1" when the output value of constant reactive power control circuit 16 reaches a value less than the output value of a function generator 31 (to be later described). The output signal from comparator 29 is fed into a monostable multivibrator 32 so as to be held for a specified period of time after reception as a SHR interrupting signal. When SHR is interrupted and the interruption state thereof is maintained as monitored by (indicated by a high level SHR interruption state signal), an on-delay timer 34, should the output value of the constant reactive power control circuit 16 equal the output value of margin angle limiter control circuit 7B, comparator 29 produces a logic signal "1". This causes monostable multivibrator 32 to produce a logic signal "1". An AND logic element 36 therefore establishes and produces a logical product of "1" which becomes a SC closing signal.

The output signal from comparator 30 is fed into a monostable multivibrator 33 so as to be held for a specified period of time after reception as a SC interrupting signal.

When SC is interrupted and the interruption state thereof is maintained (indicated by a high level SC interruption state signal), as monitored by an on-delay timer 35, should the output value of constant reactive power control circuit 16 become smaller than the output value of a function generator 31 in which a detected active power Pd is converted into a value corresponding to a control delay angle α of a converter, comparator 30 produces an output of logic signal "1". When this produced logic signal "1" is fed through monostable multivibrator 33 into an AND logic element 37, a logical product "1" is established and outputted as a SHR closing signal.

The states of SCs 28A and 28B, and SHRs 26A and 26B can be monitored by detecting the states of circuit breakers 27A and 27B, and 25A and 25B, respectively.

Figure 3:
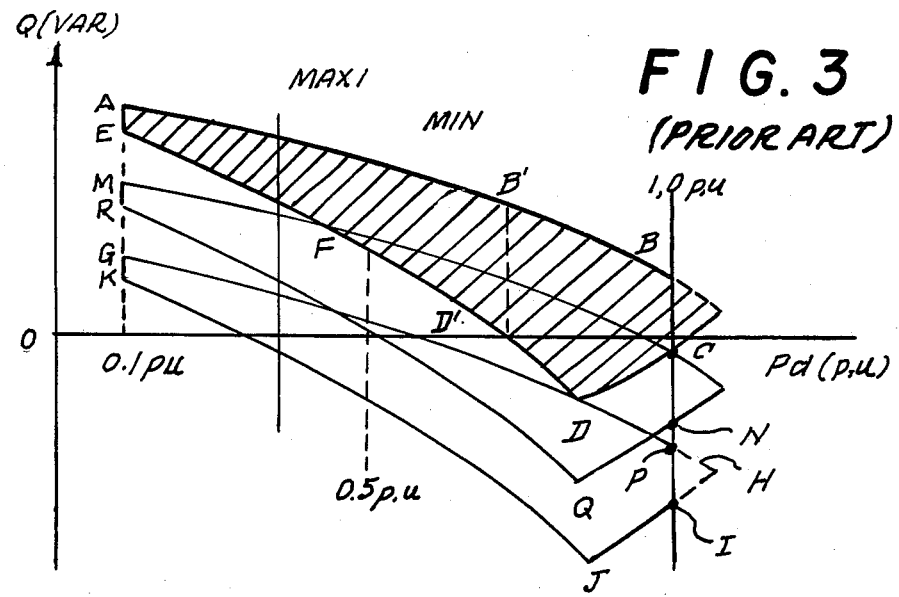
FIG. 3 is a graph illustrating the relationship of transmission power and reactive power in the DC power transmission system in FIG. 1.
Figure 5:
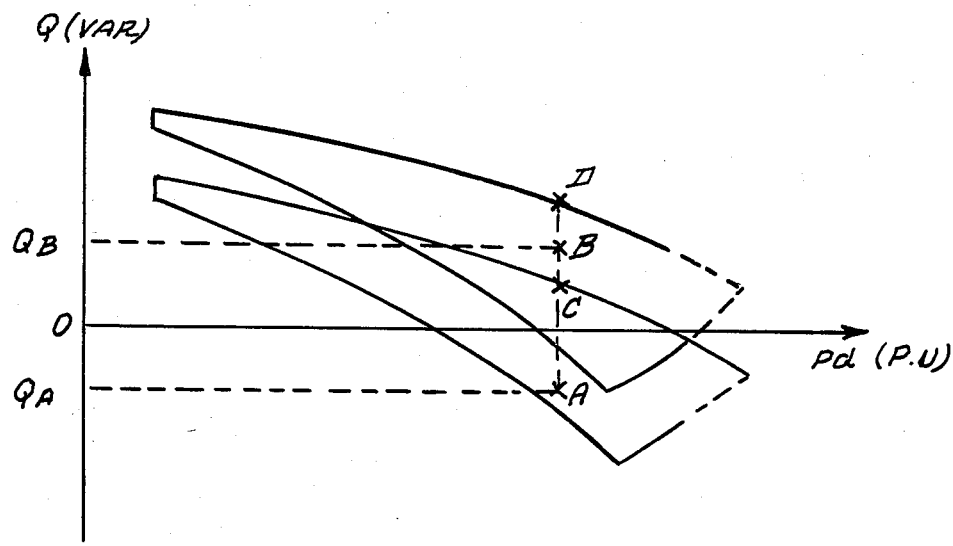
FIG. 5 is a graph illustrating the relationship of transmission power and reactive power in the case where the shunt capacitor is closed under the condition in which the shunt capacitor and the shunt reactor are not closed, and thereafter the thus closed shunt capacitor is interrupted by virtue of a power converter apparatus according to the present invention.

FIG. 5 is a diagram drawn partially from FIG. 3 for the following explanations.

Figure 1:
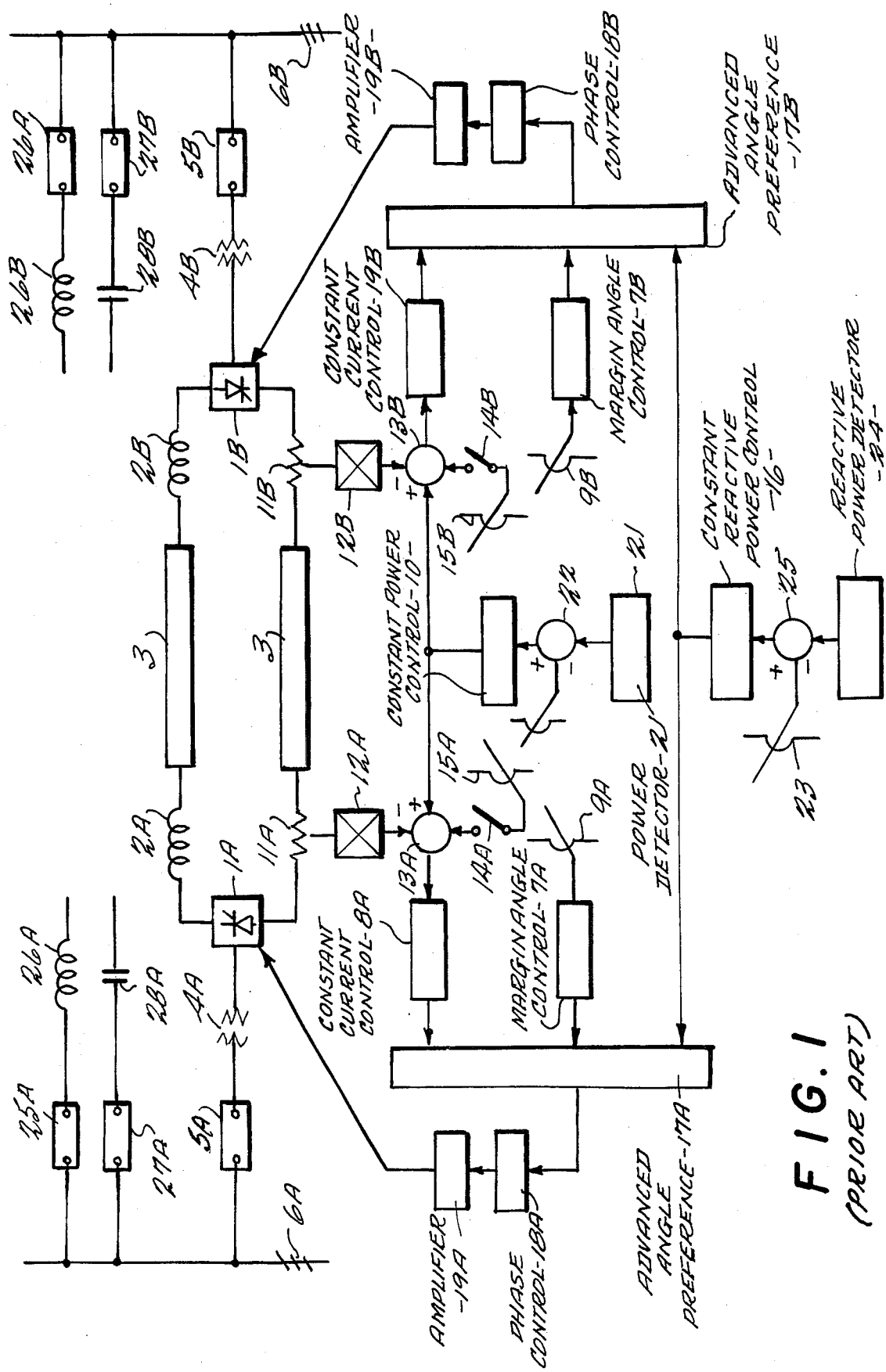
FIG. 1 is a schematic block diagram illustrating the conventional DC power transmission system.
Figure 2:
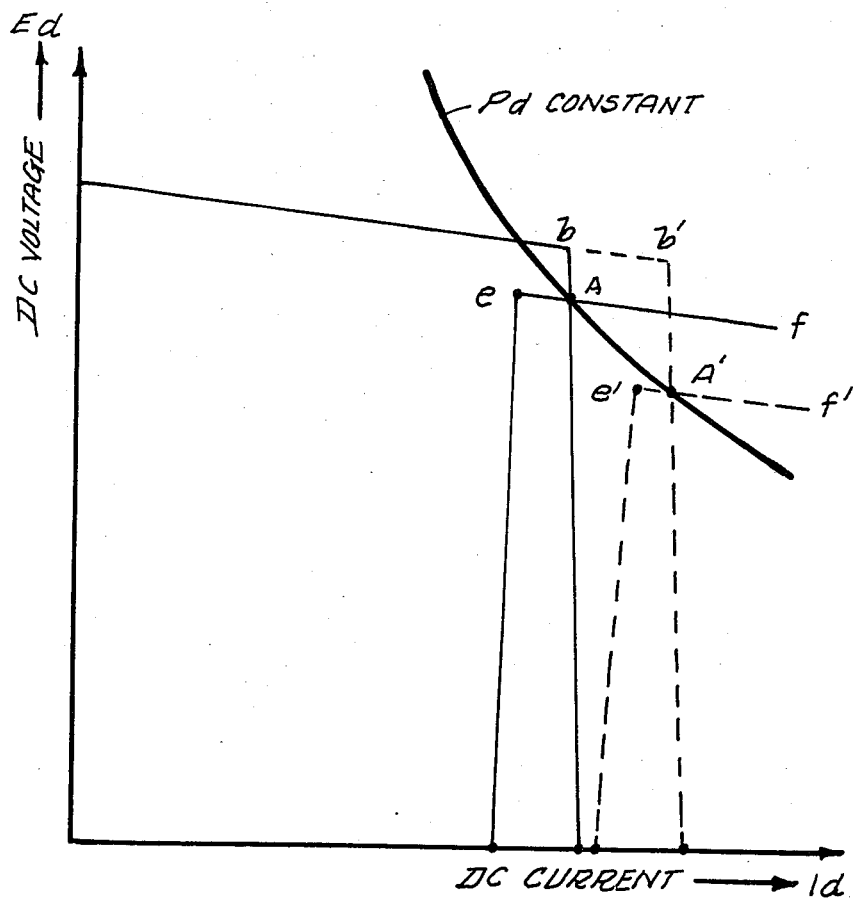
FIG. 2 is a graph illustrating characteristic curves of the converters within the DC power transmission system in FIG. 1.

In FIG. 5, the operation point of the converter is assumed to be the point A. Namely, both SHR 26B and the SC 28B are in the state of interruption. Under this condition, when it becomes necessary for some means to operate the converters at the point B, a human operator manually changes the set point of reactive power reference setter 23 in FIG. 1 from $Q_A$ to $Q_B$. This change of the set point causes the constant reactive power control circuit 16 to operate such that the margin angle γ decreases and the operation point reaches the point C. Since the point C is the limit point of the margin angle γ, the output value of margin angle limiter control circuit 7B in FIG. 1 is selected instead of the output value of constant reactive power control circuit 16 by control advanced angle preference circuit 17B. Consequently the output value of constant reactive power control circuit 16 coincides with the output value of margin angle limiter control circuit 7B. At this instant, the monostable multivibrator 32 in FIG. 4 produces an output of logic signal "1". However, since SHR 26B has already been interrupted, AND logic element 36 produces an output of logic signal "1" which is a closing command for SC 28B so as to cause SC 28B to be closed.

On-delay timer 34 is installed in order to prevent SHR 26B and SC 28B from being transiently and repeatedly interrupted and closed.

When SC 28B is closed, the operation point in FIG. 5 moves once from the point C to the point D, however, ultimately moves to the point B by the effect of constant reactive power control circuit 16.

Here, when active power is defined as P, reactive power Q, control delay angle γ, and power factor cos φ respectively, there are held the following equations:

$$Q = P \cdot \tan \phi \quad (1)$$

$$\cos \phi \approx \frac{\cos \alpha + \cos \gamma}{2} \quad (2)$$

from the equations (1) and (2), $$\alpha = \cos^{-1} \sqrt{\frac{4P^2}{P^2 + Q^2}} - \cos \gamma \quad (3)$$

In the equation (3), if γ is assumed to be γ min, control delay angle α corresponding to the curve which has a difference ΔQ compared with the curve P-Q at γ min can be calculated when the value of P is known. Therefore, function generator 31 in FIG. 4 functions to receive the detected active power value Pd from active power detector 21 in FIG. 1 so as to calculate and produce control delay angle α corresponding to the detected active power value Pd.

Figure 6:
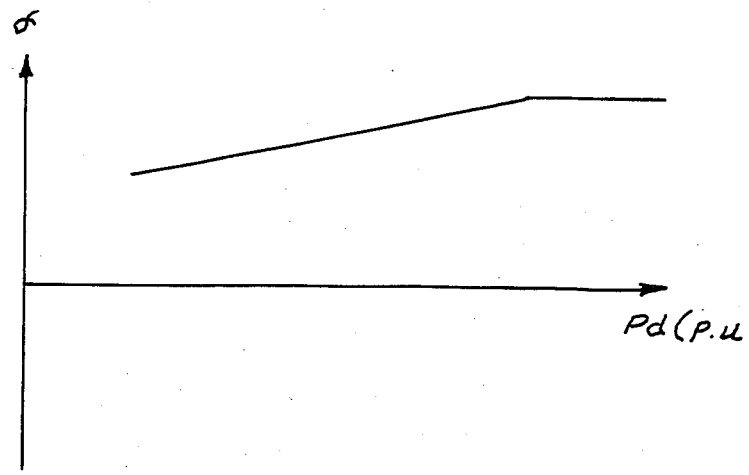
FIG. 6 is a graph illustrating the relationship of transmission power and control angle.

FIG. 6 is a diagram illustrating the Pd-α curve corresponding to the curve which has a difference ΔQ compared with the curve P-Q at γ min. As can be seen from FIG. 6, the curve Pd-α can be approximated by substantially two straight lines. Thus, the curve Pd-α can be readily constructed with operational amplifiers for example.

Referring now back to FIG. 5, in the case when the operation point of the converters is required to change conversely from the point B to the point A, the set point of reactive power reference setter 23 in FIG. 1 is changed from $Q_B$ to $Q_A$. This causes the output value of constant reactive power control circuit 16 to be decreased, and in the process of decrease thereof, comparator 30 and monostable multivibrator 33 in FIG. 4 respectively produces an output of logic signal "1", so that SC 28B is automatically interrupted, and ultimately the operation point B reaches the point A. The above-described difference ΔQ is provided for the purpose of preventing frequent open-close operations of the interrupters which can be anticipated in the case where a closing command and an interrupting command are produced as a result of identical Q (or γ).

In the above, the description was made with respect to the case where SC 28B is closed after SHR 26B was interrupted. But when lagging reactive power is to be increased, SHR 26B is closed after the SC 28B was interrupted.

Although the embodiment of the present invention has been described as to the reactive power control of the AC power system, even when the AC voltage of the AC power system is controlled, the change of the AC voltage is substantially equal to the product of the change of the reactive power and the reactance of the AC power system, so that only by substituting the reactive power control of the present invention for the AC power system voltage control, the AC voltage control of the AC power system can be readily achieved without any other modification in configuration and performance.

In the case of a DC transmission system, the control apparatus for phase-modifying equipment shown in FIG. 4 may be separately installed for converter 1A and converter 1B so that the phase-modifying equipment corresponding to whichever of converter 1A which is operating as an inverter may operate. However, the control apparatus can also be installed in common frequency conversion systems so that the phase-modifying equipment controls elements 26A and 28A or elements 26B and 28B depending on whether converter 1A or converter 1B is operating as an inverter.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for converting DC power to AC power comprising:
   means for converting DC power to AC power;
   first means for selectively rendering reactive power more leading;
   second means for selectively rendering reactive power more lagging;
   margin angle limiter control means for limiting a margin angle of said converting means;
   constant reactive control means for controlling said converting means to maintain constant a characteristics of said AC power influenced by all reactance connected to said AC power;
   means for generating a value corresponding to a control delay angle related to a characteristic of said AC power influenced by all resistance connected to said AC power; and
   a control structure including:
   (1) means for at least one of connecting said second means to said AC power and disconnecting said first means from said AC power when an output value of said constant reactive control means achieves a predetermined relationship with an output value of said margin angle limiter control means, and
   (2) means for at least one of disconnecting said second means from said AC power and connecting said first means to said AC power when an output value of said constant reactive control means achieves a predetermined relationship with said control delay angle value.

2. Apparatus according to claim 1 wherein:
   said first means includes a shunt capacitor and said second means includes a shunt capacitor;
   said generating means includes means for detecting an active power value of said AC power and function generator means, connected to receive said detected active power value, for converting said detected active power value into said control delay angle of said converting means; and
   said control means includes:
   first comparator means, connected to said constant reactive control structure and said margin angle limiter control means for generating a signal when an output value of said constant reactive control means becomes equal to an output value of said margin angle limiter control means,
   first monostable multivibrator means for holding the output of said first comparator means as a first command signal to cause disconnection of said shunt reactor,
   first on-delay timer means for detecting a shunt reactor disconnection state and producing a signal related to the thus detected state after a specified constant period of time delay,
   first gate means, responsive to the output of said first on-delay timer means and said first command signal for generating a second command signal to cause connection of said shunt capacitor,
   second comparator means, connected to said function generator means and said constant reactive control means for generating a signal when an output of said function generator means exceeds the output of said constant reactive control means,
   second monostable multivibrator means for holding the output of said second comparator means as a third command signal to cause disconnection of said shunt capacitor,
   second on-delay timer means for detecting a shunt capacitor disconnection state and producing a signal related to the thus detected state after a specified constant period of time delay, and
   second gate means, responsive to the output of said second on-delay timer means and said third command signal for generating a fourth command signal to cause connection of said shunt reactor.

3. Apparatus according to claim 1 wherein said control means disconnects said first means when said first means has been connected to said AC power, connects said second means when said first means has not been connected to said AC power, disconnects said second means when said second means has been connected to said AC power, and connects said first means when said second means has not been connected to said AC power.

4. A power transmission system comprising:
   a first converter having an AC terminal and a DC terminal;
   a second converter having a DC terminal connected to said DC terminal of said first converter and an AC terminal;
   means for selecting one of said converters to pass power from said AC terminal to said DC terminal and the other of said converters to pass a power from said DC terminal to said AC terminal;
   first means for selectively rendering reactive power at said AC terminal of said other converter more leading;
   second means for selectively rendering reactive power at said AC terminal of said other converter more lagging;
   margin angle limiter control means for limiting a margin angle of said other converter;
   constant reactive control means for controlling said other converter to maintain constant a characteristic of AC power influenced by all reactance connected to said AC terminal of said other converter;
   means for generating a value corresponding to a control delay angle related to a characteristic of said AC power influenced by all resistance connected to said AC terminal of said other converter; and
   a control structure including:
   (1) means for at least one of connecting said second means to said AC terminal of said other converter and disconnecting said first means from said AC terminal of said other converter when an output value of said constant reactive control means achieves a predetermined relationship with an output value of said margin angle limiter control means, and
   (2) means for at least one of disconnecting said second means from said AC terminal of said other converter and connecting said first means to said AC terminal of said other converter when an output value of said constant reactive control means achieves a predetermined relationship with said control delay angle value.

5. Apparatus according to claim 4 wherein said control structure includes:
   means for disconnecting said first means when said first means has been connected to said AC terminal of said other converter,
   means for connecting said second means when said first means has not been connected to said AC terminal of said other converter, means for disconnecting said second means when said second means has been connected to said AC terminal of said other converter, and means for connecting said first means when said second means has not been connected to said AC terminal of said other converter.

6. Apparatus according to claim 4 wherein:

said first means includes shunt capacitor and said second means includes a shunt reactor;

said generating means includes means for detecting an active power value of said AC power at said AC terminal of said other converter and function generator means, connected to receive said detected active power value, for converting said detected active power value into said control delay angle of said other converter; and said control structure includes:

first comparator means, connected to said constant reactive control means and said margin angle limiter control means for generating a signal when an output value of said constant reactive control means becomes equal to an output value of said margin angle limiter control means, first monostable multivibrator means for holding the output of said first comparator means as a first command signal to cause disconnection of said shunt reactor, first on-delayed timer means for detecting a shunt reactor disconnection state and producing a signal indicating the thus detected state after a specified constant period of time delay, first gate means, responsive to the output of said first on-delayed timer means and said first command signal for generating a second command signal to cause connection of said shunt comparator, second comparator means, connected to said function generator means and said constant reactive control means for generating a signal when an output of said function generator means exceeds the output of said constant reactive control means, second monostable multivibrator means for holding the output of said second comparator means as a third command signal for causing disconnection of said shunt comparator, second on-delayed timer means for detecting a shunt comparator disconnection state and producing a signal related to the thus detected state after a specified constant period of time delay, and second gate means, responsive to the output of said second on-delayed timer means and said third command signal for generating a fourth command signal to cause connection of said shunt reactor.

* * * * *